United States Patent [19]

Shiratori et al.

[11] Patent Number: 4,593,931
[45] Date of Patent: Jun. 10, 1986

[54] VEHICLE HEIGHT ADJUSTMENT SYSTEM PROVIDING UNIFORM HEIGHT CONTROL

[75] Inventors: Harunori Shiratori; Masaru Ishikawa, both of Toyota; Hisami Kato, Tokyo, all of Japan

[73] Assignee: Toyota Jidosha Kabushiki Kaisha, Toyota, Japan

[21] Appl. No.: 660,125

[22] Filed: Oct. 12, 1984

[30] Foreign Application Priority Data

Oct. 17, 1983 [JP] Japan ................. 58-193773

[51] Int. Cl.⁴ ......................................... B60G 17/00
[52] U.S. Cl. ................. 280/714; 280/6 R; 180/41
[58] Field of Search .......... 280/707, 712, 6 H, 6 R, 280/714; 180/41

[56] References Cited

U.S. PATENT DOCUMENTS 4,216,977  8/1980  Fujii ..................... 280/714
4,382,604  5/1983  Nakagawa .............. 280/714
4,462,610  7/1984  Saito ..................... 280/714

Primary Examiner—Richard A. Bertsch
Attorney, Agent, or Firm—Oblon, Fisher, Spivak, McClelland & Maier

[57] ABSTRACT

This height adjustment system includes: a source of pressurized working fluid; several fluid pressure actuated wheel suspension units, each of which resiliently pushes a one of the wheels of the vehicle downwards with respect to the body thereof, according to the amount of pressurized working fluid supplied to it; a passage means for conducting supply of working fluid from the source to the wheel suspension units; several valve means, provided at intermediate points of the passage means, for controlling flow of working fluid therethrough; and a flow divider means which has an inlet and two outlets, one of the outlets being communicated to a first set of the wheel suspension units for a first set of the wheels of the vehicle and the other of the outlets being communicated to a second disjoint set of the wheel suspension units for a second disjoint set of the wheels of the vehicle. This flow divider is incorporated at an intermediate point of the passage means, provides a branch point of the passage means, and receives supply of pressurized working fluid at its inlet and divides this supply between its two outlets in a ratio which is substantially independent of the pressures at these two outlets. Optionally, this flow divider may be controllable with regard to the ratio in which it divides the fluid input to it through this inlet between these two outlets.

14 Claims, 4 Drawing Figures

VEHICLE HEIGHT ADJUSTMENT SYSTEM PROVIDING UNIFORM HEIGHT CONTROL

BACKGROUND OF THE INVENTION

The present invention relates to a vehicle height adjustment device, and in particular to a vehicle height adjustment device which provides suspension for the wheels of a vehicle and which can raise or lower the body of the vehicle in a controlled and regular fashion.

A suspension system for a vehicle in which the height of the various parts of the vehicle body from the ground can be adjusted typically comprises: a source of pressurized working fluid, which may be a substantially incompressible working fluid such as oil or hydraulic fluid, but may alternatively be a compressible working fluid such as compressed air, and which is typically pressure controlled as for example by a pressure control valve; a number of fluid pressure actuated wheel suspension units, one for each of the wheels of the vehicle, each of which when supplied with pressurized working fluid pushes its wheel downwards with respect to the vehicle body and thereby lifts the vehicle body up from the ground; a branching conduit system, which supplies the pressurized working fluid to these wheel suspension units; and a plurality of control valves at various points of this branching conduit system, which according to their selective actuation by a control system for the vehicle height adjustment system selectively provide more or less such pressurized working fluid to the various wheel suspension units by being opened or closed.

In such a type of per se conventional vehicle height adjustment system, however, difficulties tend to arise with respect to smooth and coordinated alteration of the vehicle elevation. Typically, the flow resistances of the various parts of the conduit system which branch to these various wheels of the vehicle will be different, according to their different length; and quite often the flow resistances of the conduits to corresponding wheels on the left and the right of the vehicle, even, will differ. This means that, when the vehicle height is to be altered by raising it for example, at each of the branch points of the branching conduit system where the flow of pressurized working fluid from the source thereof is branched to be supplied to various ones of the wheels or to various combinations thereof, this pressurized working fluid flow will tend to be preferentially directed to that branch of the branching conduit system which provides the lesser flow resistance, and this means that all the wheels of the vehicle are not driven down with respect to its body in unison. This problem of uneven and unpredictable division of the flow of working fluid at each of the branch points of the branching conduit system is aggravated by variations of load on the vehicle and by alteration of the viscosity of the working fluid due to effects of temperature and contamination. Thus, the speed of adjustment of vehicle height may differ from one wheel to another, and from one end of the vehicle, or one side thereof, to the other. This may cause the attitude of the vehicle body to change during the process of alteration of vehicle elevation, which not only can cause anxiety to the driver and passengers of the vehicle, but can cause alteration of the field of vision of the driver, disturbance in the adjustment of the headlamps of the vehicle, deterioration of the drivability and the favorable running conditions of the vehicle, and worsening of the aerodynamic qualities of the vehicle which can damage the fuel economy thereof.

Further, because typically other subsystems of the vehicle other than the suspension system also utilize pressurized working fluid, further in the prior art there is a wasteful duplication of working parts in the vehicle as a whole, because other separate pumps and pressure control valves have been used for providing pressurized working fluid for these other subsystems. Accordingly the compactness and weight of the vehicle, and the reliability thereof, have been deteriorated.

SUMMARY OF THE INVENTION

Accordingly, it is the primary object of the present invention to provide a vehicle height adjustment system which provides good division of the supply of pressurized working fluid between the suspension systems of the various wheels of the vehicle.

It is a further object of the present invention to provide such a vehicle height adjustment system which allows the vehicle elevation to be changed without disturbing the vehicle attitude.

It is a further object of the present invention to provide such a vehicle height adjustment system which can raise or lower the various parts of the vehicle at the same speed.

It is a further object of the present invention to provide such a vehicle height adjustment system which can synchronize the starting and ending points of raising or lowering of the various parts of the vehicle.

It is a further object of the present invention to provide such a vehicle height adjustment system which can properly change the vehicle height substantially irrespective of the vehicle load condition.

It is a yet further object of the present invention to provide such a vehicle height adjustment system which is not disturbed in its operation by change of the viscosity of the working fluid.

It is a yet further object of the present invention to provide such a vehicle height adjustment system which does not cause anxiety to the occupants of the vehicle.

It is a yet further object of the present invention to provide such a vehicle height adjustment system which does not worsen the visual field of the driver during the vehicle height adjustment process.

It is a yet further object of the present invention to provide such a vehicle height adjustment system which does not deteriorate the drivability of the vehicle.

It is a yet further object of the present invention to provide such a vehicle height adjustment system which does not disturb the adjustment of the headlamps during the vehicle height adjustment process.

It is a yet further object of the present invention to provide such a vehicle height adjustment system which does not deteriorate the aerodynamic qualities of the vehicle.

It is a yet further object of the present invention to provide such a vehicle height adjustment system which keeps the vehicle economy good, even during the process of vehicle height adjustment.

It is a yet further object of the present invention to provide such a vehicle height adjustment system which keeps vehicle running conditions good at all times.

It is a yet further object of the present invention to provide such a vehicle height adjustment system which provides good vehicle compactness and lightness.

It is a yet further object of the present invention to provide such a vehicle height adjustment system which keeps the total vehicle cost low.

According to the most general aspect of the present invention, these and other objects are accomplished by a height adjustment system for a vehicle with wheels and a body, comprising: (a) a source of pressurized working fluid; (b) a plurality of fluid pressure actuated wheel suspension units, each of which resiliently pushes a one of said wheels of said vehicle downwards with respect to said body thereof, according to the amount of pressurized working fluid supplied to said wheel suspension unit; (c) a passage means for conducting supply of working fluid from said source thereof to said wheel suspension units; (d) a plurality of valve means, provided at intermediate points of said passage means, for controlling flow of working fluid therethrough; and (e) a flow divider means comprising an inlet and two outlets, one of said outlets being communicated to a first set of said wheel suspension units for a first set of said wheels of said vehicle and the other of said outlets being communicated to a second disjoint set of said wheel suspension units for a second disjoint set of said wheels of said vehicle, incorporated at an intermediate point of said passage means, for providing a branch point of said passage means and for receiving supply of pressurized working fluid at its said inlet and for dividing said supply between its two said outlets in a ratio which is substantially independent of the pressures at said two outlets.

According to such a structure, because the flow divider means divides the supply of pressurized working fluid fed to it in said substantially determinate ratio between its two outlets, in other words between said first set of said wheel suspension units for said first set of said wheels of said vehicle and said second disjoint set of said wheel suspension units for said second disjoint set of said wheels of said vehicle, irrespective of the pressures at said two outlets, thereby the raising and/or lowering of said first and second sets of wheels of said vehicle are performed at substantially the same relative rate, whatever may be the load distribution on the vehicle. Specifically, in the case that said first and second sets of the vehicle wheels are the front and the rear wheels thereof, it is possible to adjust the vehicle elevation while maintaining its body horizontal with regard to the fore and aft direction, i.e. without its body rotating about its pitch axis. And also, by appropriately selecting said ratio of flow division provided by said flow divider, it becomes possible also to synchronize the starting and the ending of vehicle height adjustment relative to the various wheels thereof, even if the amount of adjustment of the vehicle wheel elevation may mutually differ between the wheels. Accordingly, this vehicle height adjustment system can properly change the vehicle height substantially irrespective of the vehicle load condition, and further is not disturbed in its operation by change of the viscosity of the working fluid. Accordingly, this vehicle height adjustment system is not liable to cause anxiety to the occupants of the vehicle, and also does not worsen the visual field of the driver during the vehicle height adjustment process, as well as not deteriorating the drivability of the vehicle. Further, this vehicle height adjustment system does not disturb the adjustment of the headlamps during the vehicle height adjustment process, and also does not deteriorate the aerodynamic qualities of the vehicle, thus keeping the vehicle economy good even during the process of vehicle height adjustment. Thus, the present invention keeps vehicle running conditions good at all times.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the description, spatial terms are to be everywhere understood in terms of the relevant figure; and in the drawings, like parts and spaces and so on are denoted by like reference symbols in the various figures thereof, and:

DESCRIPTION OF THE PREFERRED EMBODIMENTS

Figure 1:
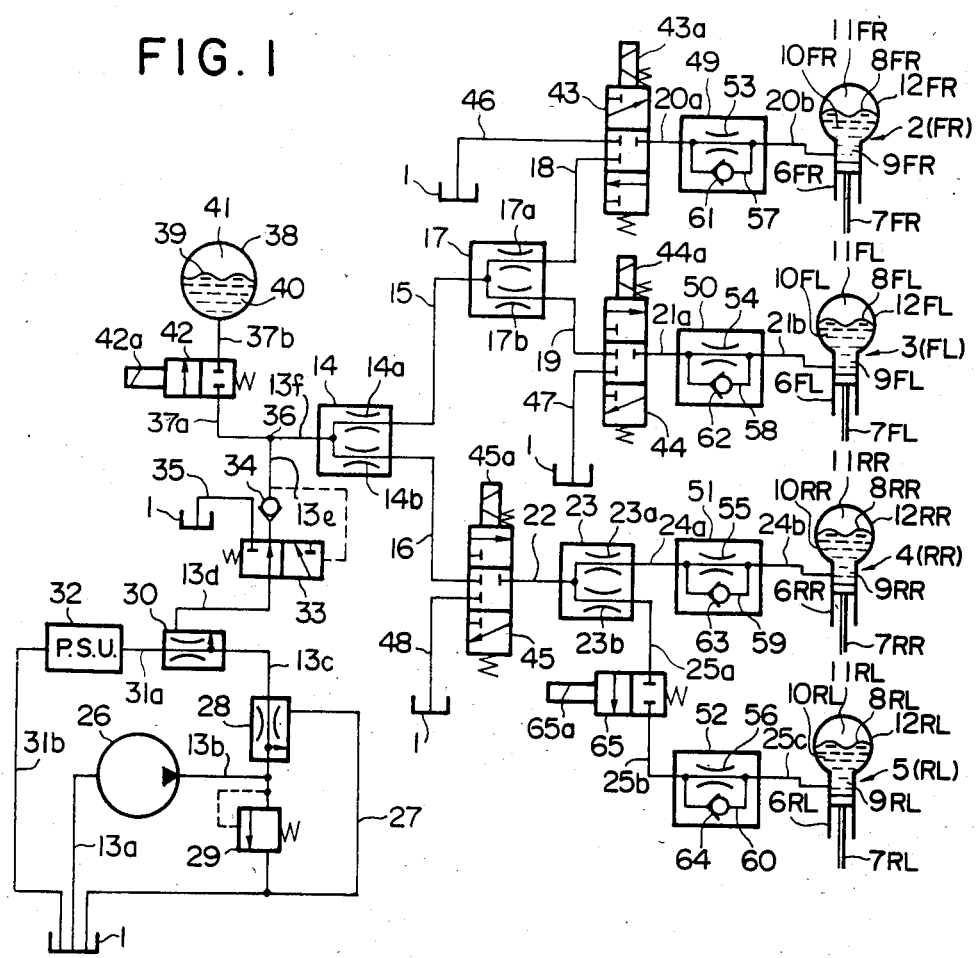
FIG. 1 is a schematic view which relates to both of the preferred embodiments of the vehicle height adjustment system according to the present invention.

The present invention will now be described with reference to the preferred embodiments thereof, and with reference to the appended drawings. FIG. 1 is a schematic diagram showing the general construction of either of the first and the second preferred embodiments of the vehicle height adjustment system according to the present invention, said embodiment being fitted to a vehicle which is not shown. In this figure, which shows the various elements of this system only schematically, the reference numeral 1 denotes a fluid reservoir which during operation of the system contains a supply of the working fluid for the system; the shown and described preferred embodiments of the present invention are adapted for using a substantially incompressible working fluid such as oil or hydraulic fluid, but an alternative embodiment could employ a compressible working fluid such as compressed air or the like. Four suspension units for the vehicle wheels (none of these wheels are shown) are provided: one suspension unit denoted by the reference number 2 for the front right wheel of the vehicle, one suspension unit 3 for the front left wheel, one suspension unit 4 for the rear right wheel, and one other suspension unit 5 for the rear left wheel. These four suspension units 2, 3, 4, and 5 are all similarly constructed, and corresponding ones of their parts are denoted in the figure by the same reference numerals with, respectively, the letters "FR" for "front right", "FL" for "front left", "RR" for "rear right", and "RL" for "rear left", affixed. Thus, considering the suspension unit 2 for the front right wheel, it comprises a cylinder 6FR, the upper end part of which constitutes a cylinder chamber 9FR which is communicated to a pressure tank 12FR and in which a piston and rod assembly 7FR sealing slides; this cylinder 6FR and pressure tank 12FR are fixedly mounted to the body of the vehicle, while the piston and rod assembly 7FR is drivingly connected to the front right wheel of the vehicle, which is mounted via a suspension arm or the like not shown to the vehicle body so as to be movable up and down with respect thereto, so that, as the piston and rod assembly 7FR moves downwards in the figure with repect to the cylinder 6FR and the pressure tank 12FR in the direction to increase the volume of the cylinder chamber 9FR of said cylinder 6FR which is communicated to said pressure tank 12FR, said front right wheel of the vehicle is moved downwards with respect to said body thereof, so as to raise the front right corner of the vehicle further off the ground. And this pressure tank 12FR is separated by a diaphragm 8FR into a gas chaber 11FR defined above said diaphragm 8FR in the figure which is isolated and a working fluid chamber 10FR defined below said diaphragm 8FR in the figure which is communicated with the cylinder chamber 9FR. Typically, the gas chamber 11FR defined above the diaphragm 8FR is filled with gas such as air at quite a high pressure, for providing a cushioning effect for the front right wheel. And the arrangements with respect to the other suspension units 3, 4, and 5 for the other three wheels of the vehicle are similar, and hence will not be particularly discussed herein. However, as an alternative construction, any form of hydraulic or pneumatic suspension units for a vehicle, such as for example hydraulic ram type devices, could be incorporated into a system according to the present invention, as long as they functioned to increase or decrease the vehicle height accordingly as they were respectively supplied with pressurized working fluid or were drained thereof.

A pump 26 driven by the engine of the vehicle, not shown in the figure, picks up working fluid from the working fluid reserve tank 1 via a conduit 13a and supplies it under pressure via another conduit 13b to a flow rate control valve 28, which transmits it to a conduit 13c. This flow rate control valve 28 places a limit on the flow rate of the working fluid passing through the conduit 13c downstream thereof by returning excess of the working fluid supplied to it via a return conduit 27 to the reserve tank 1. And to a point of the conduit 13b just upstream of the flow rate control valve 28 there is connected a pressure relief valve 29, which vents the pressurized working fluid in said conduit 13b back to the reserve tank 1 when the pressure thereof rises to be higher than a certain predetermined value. Thus, the flow of working fluid in the conduit 13c is stabilized both with regard to its pressure and with regard to its flow rate.

The downstream end of the conduit 13c is communicated to a flow priority valve 30. This flow priority valve 30 diverts a predetermined amount of the working fluid flowing in the conduit 13c upstream of it and supplies said predetermined amount to a conduit 31a which leads to another device 32 such as a power steering unit which is operated by pressurized working fluid, while transmitting the remaeder of said working fluid flowing in said conduit 13c to a conduit 13d downstream of it. The power steering unit 32 is drained of spent working fluid back to the reserve tank 1 via another conduit 31b. However, as an alternative construction, the flow priority valve 30 could divert a predetermined amount of the working fluid in the conduit 13c upstream of it and supply said predetermined amount to the conduit 13d downstream of it, while transmitting the remainder of said working fluid in said conduit 13c to the conduit 31a leading to the device 32 such as a power steering unit.

The downstream end of the conduit 13d leads to a pressure control valve 33, which supplies the working fluid to another conduit 13e via a one way valve 34 which allows said working fluid to flow in the direction from the pressure control valve 33 into the conduit 13e but not in the reverse direction. The pressure control valve 33 vents some of the pressurized working fluid in the conduit 13d back to the working fluid reserve tank 1 via a drain conduit 35 when the pressure in said conduit 13e downstream of said pressure control valve 33 rises to be higher than another certain predetermined value. This pressure control valve 33 is thus in fact, as indicated by the dashed line in FIG. 1, controlled by the pressure in said conduit 13e downstream of the one way valve 34. Thus, the flow of working fluid in the conduit 13e is stabilized with regard to its pressure.

The conduit 13e leads to a conduit junction point 36, from which lead two further conduits 13f and 37a. The conduit 37a leads to an electromagnetic switching valve 42 which incorporates a solenoid 42a, and from which another conduit 37b leads to a working fluid accumulator 38. The electromagnetic switching valve 42 controls communication between the conduits 37a and 37b, and, when its solenoid 42a is supplied with actuating electrical energy, then said electromagnetic switching valve 42 is opened and communicates the conduit 37a and the conduit 37b to one another, while on the other hand, when said solenoid 42a of said electromagnetic switching valve 42 is not supplied with actuating electrical energy, then said electromagnetic valve 42 is closed and discommunicates the conduit 37a and the conduit 37b from one another. The body of the accumulator 38 is formed as a tank and is separated by a diaphragm 39 into a gas chamber 41 defined above said diaphragm 39 in the figure which is isolated and a working fluid chamber 40 defined below said diaphragm 39 in the figure which is communicated with the conduit 37b which leads to said accumulator 38. Typically, the gas chamber 41 above the diaphragm 39 is filled with gas such as air at quite a high pressure, for providing a certain cushioning effect to the action of the accumulator 38.

The other conduit 37f leading from the junction point 36 leads to a flow divider 14, which divides the flow of working fluid in said conduit 37f into two flows, one of which is supplied into a conduit 15 which relates to the suspension mechanisms for the front wheels of the vehicle, while the other of said flows is supplied into another conduit 16 which relates to the suspension mechanisms for the rear wheels of the vehicle. In the view relating to both of the preferred embodiments of the present invention shown in FIG. 1, this flow divider 14 is only schematically shown as incorporating two throttling devices 14a and 14b connected so as to branch from the end of the conduit 37b, but later two possible particular structures for this flow divider 14, corresponding to the first and the second preferred embodiments of the present invention, will be described. In any case, functionally, the flow divider 14 divides the flow of working fluid that enters it at its input from the conduit 37f into the aforementioned two flows, one going to its outlet 5 which leads to the conduit 15, while the other goes to its other outlet which leads to the other conduit 16, the proportion by which said flow is divided being determinate and being substantially independent of the resistances offered by said conduits 15 and 16. Naturally, this is not theoretically absolutely exactly possible, but because of the flow dividing operation as exemplarily described later with regard to FIGS. 3 and 4 this function can be provided to a first approximation. And in the flow divider 14 of the preferred embodiments of the present invention the proportion by which said flow in the conduit 13f is divided between the two output conduits 15 and 16 is determined according to the relative flow resistances of the two throttling devices 14a and 14b in the flow divider 14.

Now, considering the arrangements relating to the suspension of the front wheels of the vehicle, the conduit 15 leads to another flow divider 17, which again is schematically shown in FIG. 1, and in the shown preferred embodiments is similar to the just described flow divider 14, containing two throttling devices 17a and 17b. This flow divider 17 is connected to two output conduits 18 and 19, and again functionally the flow divider 17 divides the flow of working fluid that enters it at its input from the conduit 15 into two flows, one going to its outlet which leads to the conduit 18 while the other goes to its other outlet which leads to the other conduit 19, the proportion by which said flow is divided being determinate and being substantially independent of the resistances offered by said conduits 18 and 19, with the same caveat as before applying. Again, the particular structures described later will be acceptable for this flow divider 17. And, again, in the construction shown in FIG. 1 the proportion by which said flow in the conduit 15 is divided between the conduits 18 and 19 is to a first approximation determined according to the relative flow resistances of the two throttling devices 17a and 17b in the flow divider 17.

The conduits 18 and 19 lead to mutually similar arrangements, respectively one of them relating to the front right wheel of the vehicle and the other relating to its front left wheel. To consider the arrangements for the suspension of the front right wheel first, the conduit 18 leads to an electromagnetic switching valve 43 comprising a solenoid 43a. According to selective supply of actuating electrical energy to said solenoid 43a, said electromagnetic switching valve 43 can be set to any one of three positions: a first position, in which it discommunicates said conduit 18, another conduit 20a leading out from said electromagnetic switching valve 43, and a drain conduit 46 which leads from said electromagnetic switching valve 43 to the working fluid reservoir 1, from one another; a second position, in which it communicates said conduit 18 and said conduit 20a to one another, while it discommunicates both of them from said drain conduit 46; and a third position, in which it communicates said conduit 20a and said drain conduit 46 to one another, while it discommunicates both of them from said conduit 18. The conduit 20a leads to a one way resistance device 49, from which a conduit 20b leads to the cylinder chamber 9FR of the suspension unit 2 for the front right wheel of the vehicle. The one way resistance device 49 comprises a throttling device 53 and a passage 57 which bypasses it, said passage 57 incorporating a one way valve 61, the sense of which is such that it allows working fluid to flow through it in the direction from the conduit 20a to the conduit 20b but not in the reverse direction. Accordingly, the one way resistance device 49, as a whole, allows working fluid to flow substantially freely through it from the conduit 20a to the conduit 20b, but allows working fluid to flow through it in the reverse direction from the conduit 20b to the conduit 20a only with a certain substantial flow resistance being presented to such reverse flow.

Similarly, now to consider the arrangements for the suspension of the front left wheel, the conduit 19 leads to an electromagnetic switching valve 44, similar to the electromagnetic switching valve 43 and comprising a solenoid 44a. According to selective supply of actuating electrical energy to said solenoid 44a, said electromagnetic switching valve 44 can be set to any one of three positions: a first position, in which it discommunicates said conduit 19, another conduit 21a leading from said electromagnetic switching valve 44, and a drain conduit 47 which leads from said electromagnetic switching valve 44 to the working fluid reservoir 1, from one another; a second position, in which it communicates said conduit 19 and said conduit 21a to one another, while it discommunicates both of them from said drain conduit 47; and a third position, in which it communicates said conduit 21a and said drain conduit 47 to one another, while it discommunicates both of them from said conduit 19. The conduit 21a leads to a one way resistance device 50, from which a conduit 21b leads to the cylinder chamber 9FL of the suspension unit 3 for the front left wheel of the vehicle. The one way resistance device 50, similarly to the one way resistance device 49, comprises a throttling device 54 and a passage 58 which bypasses it, said passage 58 incorporating a one way valve 62, the sense of which is such that it allows working fluid to flow through it in the direction from the conduit 21a to the conduit 21b but not in the reverse direction. Accordingly, the one way resistance device 50, as a whole, allows working fluid to flow substantially freely through it from the conduit 21a to the conduit 21b, but allows working fluid to flow through it in the reverse direction from the conduit 21b to the conduit 21a only with a certain substantial flow resistance being presented to such reverse flow.

Now, considering the arrangements relating to the suspension of the rear wheels of the vehicle, the conduit 16 leads to another electromagnetic switching valve 45, similar to the electromagnetic switching valves 43 and 44 and comprising a solenoid 45a. According to selective supply of actuating electrical energy to said solenoid 45a, said electromagnetic switching valve 45 can be set to any one of three positions: a first position, in which it discommunicates said conduit 16, another conduit 22 leading from said electromagnetic switching valve 45, and a drain conduit 48 which leads from said electromagnetic switching valve 45 to the working fluid reservoir 1, from one another; a second position, in which it communicates said conduit 16 and said conduit 22 to one another, while it discommunicates both of them from said drain conduit 48; and a third position, in which it communicates said conduit 22 and said drain conduit 48 to one another, while it discommunicates both of them from said conduit 16. The conduit 22 leads to another flow divider 23, which in the shown preferred embodiments of the present invention is similar to the just described flow dividers 14 and 17, and is schematically shown as containing two throttling devices 23a and 23b. This flow divider 23 is connected to two conduits 24a and 25a, and again functionally the flow divider 23 divides the flow of working fluid that enters it at its input from the conduit 22 into two flows, one going to its outlet which leads to the conduit 24a while the other goes to its other outlet which leads to the other conduit 25a, the proportion by which said flow is divided being determinate and being substantially independent of the pressures in said conduits 24a and 25a, with the same caveat as before applying. Again, later particular structures which are suitable for this flow divider 23 will be described. And, again, in the construction shown in FIG. 1 the proportion by which said flow in the conduit 22 is divided between the conduits 24a and 25a is substantially determined according to the relative flow resistances of the two throttling devices 23a and 23b in the flow divider 23.

The conduits 24a and 25a lead to mutually similar arrangements, respectively one of them relating to the rear right wheel of the vehicle and the other relating to its rear left wheel. To consider the suspension arrangements for the rear right wheel first, the conduit 24a leads to an one way resistance device 51, from which a conduit 24b leads to the cylinder chamber 9RR of the suspension unit 4 for the rear right wheel of the vehicle. The one way resistance device 51, similarly to the one way resistance devices 49 and 50, comprises a throttling device 55 and a passage 59 which bypasses it, said passage 50 incorporating a one way valve 63, the sense of which is such that it allows working fluid to flow through it in the direction from the conduit 24a to the conduit 24b but not in the reverse direction. Accordingly, the one way resistance device 51, as a whole, allows working fluid to flow substantially freely through it from the conduit 24a to the conduit 24b, but allows working fluid to flow through it in the reverse direction from the conduit 24b to the conduit 24a only with a certain substantial flow resistance being presented to such reverse flow. And, now to consider the suspension arrangements for the rear left wheel, the conduit 24a leads to an electromagnetic switching valve 65, in fact for controlling roll stability of the vehicle, which incorporates a solenoid 65a, and from which another conduit 25b leads to a one way resistance device 52. The electromagnetic switching valve 65 controls communication between the conduits 25a and 25b, and, when its solenoid 65a is not supplied with actuating electrical energy, then said electromagnetic switching valve 42 is closed and discommunicates the conduit 25a and the conduit 25b from one another, while on the other hand, when said solenoid 65a of said electromagnetic switching valve 65 is supplied with actuating electrical energy, then said electromagnetic valve 65 is opened and communicates the conduit 25a and the conduit 25b to one another. The conduit 25b leads to the aforementioned one way resistance device 52, from which a conduit 25c leads to the cylinder chamber 9RL of the suspension unit 5 for the rear left wheel of the vehicle. The one way resistance device 52, similarly to the one way resistance devices 49, 50, and 51, comprises a throttling device 56 and a passage 60 which bypasses it, said passage 60 incorporating a one way valve 64, the sense of which is such that it allows working fluid to flow through it in the direction from the conduit 25b to the conduit 25c but not in the reverse direction. Accordingly, the one way resistance device 52, as a whole, allows working fluid to flow substantially freely through it from the conduit 25b to the conduit 25c, but allows working fluid to flow through it in the reverse direction from the conduit 25c to the conduit 25b only with a certain substantial flow resistance being presented to such reverse flow.

Figure 2:
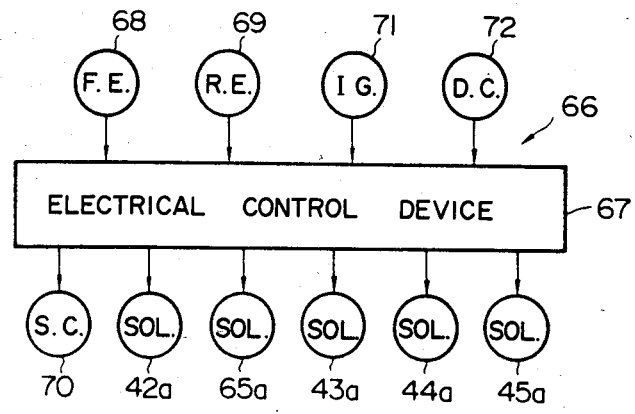
FIG. 2 is a schematic diagram of an electrical control device for said two preferred embodiments of the vehicle height adjustment system of the present invention, and of input devices which provide said electrical control device with input signals and of output devices which receive output signals from said electrical control device.

The two way electromagnetic switching valves 42 and 65 and the three way electromagnetic switching valves 43, 44, and 45 shown in FIG. 1 are controlled by selective supply of actuating electrical energy to their respective solenoids 42a, 65a, 43a, 44a, and 45a from an electrical control device 66 which is schematically shown in FIG. 2. This electrical control device 66 comprises a microcomputer, not particularly shown, and receives input signals from (possibly among other things); a front elevation sensor 68 which produces an output signal representative of the height from the ground of the front of the vehicle, i.e. of the positions of the front wheels of the vehicle relative to its body; a rear elevational sensor 69 which produces an output signal representative of the height from the ground of the rear of the vehicle, i.e. of the positions of the rear wheels of the vehicle relative to its body; an ignition sensor 71, which produces an output signal which indicates whether the engine of the vehicle is running or not, in other words whether the pump 26 is being operated or not; and a driver command means 72, which is mounted in the passenger compartment of the vehicle, and which produces an output signal indicative of the wishes of the driver of the vehicle relative to performance of the suspension system—i.e., typically, whether said driver desires a soft ride performance or a hard ride performance from said suspension. And said electrical control device 66 outputs an output signal to a suspension condition driver indicating means 70 also mounted in the passenger compartment of the vehicle, for indicating to the driver of the vehicle what actual performance is being provided by the suspension system of the vehicle, as well as outputting the aforementioned electrical signals to the solenoids 42a, 65a, 43a, 44a, and 45a for controlling the two way electromagnetic switching valves 42 and 65 and the three way electromagnetic switching valves 43, 44, and 45.

The actual details of the internal construction and operation of this electrical control device 66 will not be explained herein, but only the functional description of its operation will be given. This is because, based upon the details of said function explained in this specification, a person of ordinary skill in the computer art will be able to supplement the details of said internal construction and operational method of said control device 66 for himself without any serious difficulty. The details of this control device 66, both with regards to its structure and its operation, do not directly relate to the inventive concept of the vehicle height adjustment system of the present invention, since the present invention is essentially a matter of construction, but relate rather to the control thereof.

Thus, in function, this control device 66 receives information which allows the program stored in its microcomputer to decide upon both the actual current condition of the suspension of the vehicle (determined from such input signals as the output signal from the front elevation sensor 68 and the output signal from the rear elevation sensor 69) and upon the desirable condition of said suspension system (determined from such input signals as the output signal from the driver command means 72). And then the program stored in said microcomputer appropriately supplies output signals to the solenoids 42a, 65a, 43a, 44a, and 45a for controlling the two way electromagnetic switching valves 42 and 65 and the three way electromagnetic switching valves 43, 44, and 45, so as to bring the actual current condition of the vehicle suspension system more towards said desirable condition. To do this, it may be desirable to do one or more of the following actions, either in sequence or simultaneously (this list is not intended to be exhaustive): (a) to raise both sides of both the front and the rear of the vehicle simultaneously, with the engine of the vehicle running; (b) to raise both sides of both the front and the rear of the vehicle simultaneously, with the engine of the vehicle not running; (c) to keep the elevation of both sides of both the front and the rear of the vehicle constant; (d) to lower both sides of both the front and the rear of the vehicle simultaneously, with the engine of the vehicle either running or not running (these cases will be taken together); (e) to raise both sides of the front of the vehicle simultaneously, while keeping the elevation of both sides of the rear of the vehicle constant, thus altering the pitch angle of the vehicle; (f) to lower both sides of the front of the vehicle simultaneously, while keeping the elevation of both sides of the rear of the vehicle constant, thus again altering the pitch angle of the vehicle; (g) to raise both sides of the rear of the vehicle simultaneously, while keeping the elevation of both sides of the front of the vehicle constant, thus altering the pitch angle of the vehicle; (h) to lower both sides of the rear of the vehicle simultaneously, while keeping the elevation of both sides of the front of the vehicle constant, thus again altering the pitch angle of the vehicle; (i) to alter the relative elevation of the left and right sides of the vehicle, while keeping the general elevation of its front and its rear substantially constant; and so on. It should be understood that it may not be intended to actually cause these types of motion of the vehicle to actually occur, by performing these types of control: it may be intended to counterbalance an alteration of the loading condition of the vehicle which has tended to cause an alteration in the vehicle position in the opposite direction, in other words to cancel an undesirable opposite motion (possibly only an incipient one) of the vehicle and to return or maintain its position to the original one. Now, in these above specified exemplary cases, the following type of control is performed by the control device 66.

RAISING BOTH FRONT AND REAR TOGETHER—ENGINE RUNNING (a) When it is desired to raise both sides of both the front and the rear of the vehicle simultaneously, with the engine of the vehicle running, then the control device 66 closes the electromagnetic switching valve 42 by not supplying its solenoid 42a with actuating electrical energy, opens the electromagnetic switching valve 65 by supplying its solenoid 65a with actuating electrical energy, and controls the three electromagnetic switching valves 43, 44, and 45 to be in their above specified second positions by appropriately supplying actuating electrical energy to their solenoids 43a, 44a, and 45a. In this condition of the suspension system, the pump 26 pumps up working fluid from the reservoir 1 and supplies it, via the valves 28, 30, and 33, to the flow divider 14, which as specified previously divides said fluid flow in a determinate ratio, supplying a determinate proportion of said fluid flow to the conduit 15 which leads to the suspension system for the front wheels and a determinate complementary proportion of said fluid flow to the conduit 16 which leads to the suspension system for the rear wheels. And this flow dividing ratio does not substantially vary according to the resistance provided by these two conduits 15 and 16 and the elements downstream thereof, according to the specification of the flow divider 14 as explained above. The fluid flow in the conduit 15 is then supplied to the flow divider 17, which again divides said fluid flow in a determinate ratio, supplying a determinate proportion of said fluid flow to the conduit 18 which leads, via the electromagnetic switching valve 43 which currently is communicating together these two conduits, to the conduit 20a which leads to the suspension system for the front right wheel, and supplying a determinate complementary proportion of said fluid flow to the conduit 19 which leads, via the electromagnetic switching valve 44 which currently is communicating together these two conduits, to the conduit 21a which leads to the suspension system for the front left wheel. And this flow dividing ratio does not substantially vary even in the case of variation in the resistance provided by these two conduits 20a and 21a, etc., according to the specification of the flow divider 17 as explained above. The fluid flow in the conduit 20a flows substantially freely through the one way resistance device 49, as explained previously, to be squirted into the cylinder chamber 9FR of the suspension unit 2 for the front right wheel, so as to push the piston and rod combination 7FR downwards in the figure so as to press the front right wheel of the vehicle downwards with respect to the vehicle body, thus raising the front right corner of said vehicle body. And, similarly, the fluid flow in the conduit 21a also flows substantially freely through the one way resistance device 50 to be squirted into the cylinder chamber 9FL of the suspension unit 3 for the front left wheel, so as to push the piston and rod combination 7FL downwards in the figure so as to press the front left wheel of the vehicle downwards with respect to the vehicle body, thus raising the front left corner of said vehicle body. If the flow splitting characteristics of the flow divider 17 are properly chosen, taking into account the flow resistances of the conduit systems 20a, 20b, etc. and 21a, 21b, etc. which quite possibly may be different, then the rate of raising of the front right corner and the front left corner of the vehicle body will be ensured to be substantially the same, thus ensuring no frontwise tendency for the vehicle to turn around its roll axis as it rises. Now, further, the fluid flow in the conduit 16 is supplied, via the electromagnetic switching valve 45 which currently is communicating together these two conduits, to the conduit 22 which leads to the flow divider 23, which again divides said fluid flow in a determinate ratio, supplying a determinate proportion of said fluid flow to the conduit 24a which leads to the suspension system for the rear right wheel, and supplying a determinate complementary proportion of said fluid flow to the conduit 25a which leads to the suspension system for the rear left wheel. And this flow dividing ratio does not substantially vary even in the case of variation in the resistance provided by these two conduits 25a and 25a, etc., according to the specification of the flow divider 23 as explained above. The fluid flow in the conduit 24a flows substantially freely through the one way resistance device 51 to be squirted into the cylinder chamber 9RR of the suspension unit 4 for the rear right wheel, so as to push the piston and rod combination 7RR downwards in the figure so as to press the rear right wheel of the vehicle downwards with respect to the vehicle body, thus raising the rear right corner of said vehicle body. And the fluid flow in the conduit 25a flows, via the electromagnetic switching valve 65 which is as mentioned above kept open at this time, into the conduit 25b and thence substantially freely through the one way resistance device 52 to be squirted into the cylinder chamber 9RL of the suspension unit 5 for the rear left wheel, so as to push the piston and rod combination 7RL downwards in the figure so as to press the rear left wheel of the vehicle downwards with respect to the vehicle body, thus raising the rear left corner of said vehicle body. And, during the above outlined process, if the flow splitting characteristics of the flow divider 23 are properly chosen, taking into account the flow resistances of the conduit systems 24a, 24b, etc. and 25a, 25b, 25c, etc. which quite possibly may be different, then the rates of raising of the rear right corner and the rear left corner of the vehicle body will be ensured to be substantially the same, thus ensuring no rearwise tendency for the vehicle to turn around its roll axis as it rises. And also, if the flow splitting characteristics of the flow divider 14 are properly chosen, taking into account the flow resistances of the conduit system starting with the conduit 15 and leading to the suspension system for the front wheels of the vehicle and of the conduit system starting with the conduit 16 and leading to the suspension system for the rear wheels of the vehicle, which quite possibly may be different, then the rates of raising of the front end and of the rear end of the vehicle body will be ensured to be substantially the same, thus ensuring no tendency for the vehicle to turn around its pitch axis as it rises. And in this operational condition of the vehicle, because the electromagnetic switching valve 42 is in the closed condition, the pressurized working fluid which is stored in the accumulator 38 is not vented or wasted but is conserved at a pressure level much higher than the lowest pressure setting of the pressure control valve 33, and the pump 26 does all the work for lifting the vehicle.

RAISING FRONT AND REAR TOGETHER—ENGINE NOT RUNNING (b) When it is desired to raise both sides of both the front and the rear of the vehicle simultaneously, with the engine of the vehicle not running, then the control device 66 opens the electromagnetic switching valve 42 by supplying its solenoid 42a with actuating electrical energy, and as before opens the electromagnetic switching valve 65 by supplying its solenoid 65a with actuating electrical energy and controls the three electromagnetic switching valves 43, 44, and 45 to be in their above specified second positions by appropriately supplying actuating electrical energy to their solenoids 43a, 44a, and 45a. In this condition of the suspension system, the same flows of working fluid as outlined above in the case (a) occur, except that the source of pressurized working fluid in this case (b) is not the pump 26, but is the accumulator 38, since the working fluid in the working fluid chamber 40 thereof is driven out of said chamber 40 into the conduit 37b by the pressure of the pressurized gas such as air in the gas chamber 39 thereof, to be supplied via said conduit 37b, the electromagnetic switching valve 42 which now is open, and the conduit 37a to the conduit junction point 36, whence it is supplied to the suspension system. Accordingly, in this vehicle elevation case also, due to the provision of the flow dividers 14, 17, and 23, provided that their operational characteristics are properly chosen, no frontwise tendency occurs for the vehicle to turn around its roll axis as it rises, no rearwise tendency occurs for the vehicle to turn around its roll axis as it rises, and no tendency occurs for the vehicle to turn around its pitch axis as it rises.

KEEPING VEHICLE AT CONSTANT HEIGHT (c) When it is desired to keep the elevation of both sides of both the front and the rear of the vehicle constant, then the control device 66 opens the electromagnetic switching valve 42 by supplying its solenoid 42a with actuating electrical energy, controls the three electromagnetic switching valves 43, 44, and 45 to be in their above specified first positions by appropriately supplying actuating electrical energy to their solenoids 43a, 44a, and 45a, and, if good stability of the vehicle about its roll axis is required, closes the electromagnetic switching valve 65 by not supplying its solenoid 65a with actuating electrical energy, and otherwise, if no particular roll stabilization of the vehicle is required, opens said electromagnetic switching valve 65 by supplying its solenoid 65a with actuating electrical energy. In this condition of the suspension system, the pump 26 pumps up working fluid from the reservoir 1 and supplies it, via the valves 28, 30, and 33, to the conduit junction point 36, whence, via the conduit 37a, the electromagnetic switching valve 42 which now is open, and the conduit 37b, it refills the accumulator 38 by forcing more and more of this working fluid into the working fluid chamber 40 thereof while thereby increasing the pressure of the pressurized gas such as air in the gas chamber 39 thereof. And also, since the three electromagnetic switching valves 43, 44, and 45 are in their above specified first positions in which the conduits 20a, 21a, and 24a connected to them are isolated and are not connected to any other conduits, thereby: the suspension unit 2 for the front right wheel is isolated, with no supply of fluid either to or from its cylinder chamber 9FR and its working fluid chamber 10FR permitted; and the suspension unit 3 for the front left wheel is isolated, with no supply of fluid either to or from its cylinder chamber 9FL and its working fluid chamber 10FL permitted; and further, if as explained above the electromagnetic switching valve 65 is closed for providing good roll stability, then also the suspension unit 4 for the rear right wheel is isolated, with no supply of fluid either to or from its cylinder chamber 9RR and its working fluid chamber 10RR permitted, and the suspension unit 5 for the rear left wheel is also isolated, with no supply of fluid either to or from its cylinder chamber 9RL and its working fluid chamber 10RL permitted; but on the other hand, if as explained above the electromagnetic switching valve 65 is opened for not providing particularly good roll stability, then the combination of the suspension unit 4 for the rear right wheel and the suspension unit 5 for the rear left wheel is isolated, with no supply of fluid from outside to the combination of the cylinder chamber 9RR and its working fluid chamber 10RR and the cylinder chamber 9RL and its working fluid chamber 10RL permitted, but with interchange of fluid between said chambers permitted for providing a certain amount of rollability of the vehicle. Thus, in this operational state of the vehicle, each of the suspension units 2 through 5 for each of the wheels functions in a per se known manner for providing suspension for its wheel (by impact on the wheel forcing the piston and rod 7 thereof upwards in FIG. 1 to compress the gas such as air in the gas chamber 11 of said suspension unit), and further the pump 26 recharges the working fluid accumulator 38.

LOWERING FRONT AND REAR TOGETHER (d) When it is desired to lower both sides of both the front and the rear of the vehicle simultaneously, with the engine of the vehicle either running or not running, then the control device 66 opens the electromagnetic switching valve 42 by supplying its solenoid 42a with actuating electrical energy, opens the electromagnetic switching valve 65 by supplying its solenoid 65a with actuating electrical energy, and controls the three electromagnetic switching valves 43, 44, and 45 to be in their above specified third positions by appropriately supplying actuating electrical energy to their solenoids 43a, 44a, and 45a. In this condition of the suspension system, the accumulator 38 is cut off from any communication with the suspension arrangements for any of the wheels by the isolation provided to the downstream ends of the conduits 18, 19, and 22 by the three electromagnetic switching valves 43, 44, and 45, and accordingly, if the vehicle engine is running, continues to be refilled and maintained at the full condition by more and more of the working fluid being forced by the pump 26 into its working fluid chamber 40 while thereby the pressure of the pressurized gas such as air in the gas chamber 39 thereof is increased. Meanwhile, the fluid in the cylinder chamber 9FR and in the working fluid chamber 10FR of the suspension unit 2 for the front right wheel flows out therefrom into the conduit 20b, flows through the one way resistance device 49 with a substantial resistance being opposed to said flow by said one way resistance device 49 as explained previously, and then flows through the conduit 20a and via the electromagnetic switching valve 43 which is in its said third position is vented via the conduit 46 to the working fluid reservoir 1. Thus, the piston and rod combination 7FR is allowed to move upwards in the figure at a relatively slow and controlled speed (said speed being determined by the effective cross sectional area of the throttling device 53), so as to allow the front right wheel of the vehicle to move upwards with respect to the vehicle body, thus lowering the front right corner of said vehicle body towards the ground. Similarly, the fluid in the cylinder chamber 9FL and in the working fluid chamber 10FL of the suspension unit 3 for the front left wheel flows out therefrom into the conduit 21b, flows through the one way resistance device 50 with a substantial resistance being opposed to said flow by said one way resistance device 50, and then flows through the conduit 21a and via the electromagnetic switching valve 44 which is in its said third position is vented via the conduit 47 to the working fluid reservoir 1. Thus, the piston and rod combination 7FL is allowed to move upwards in the figure at a relatively slow and controlled speed determined by the effective cross sectional area of the throttling device 54, so as to allow the front left wheel of the vehicle to move upwards with respect to the vehicle body, thus lowering the front left corner of said vehicle body towards the ground. And the fluid in the cylinder chamber 9RR and in the working fluid chamber 10RR of the suspension unit 4 for the rear right wheel flows out therefrom into the conduit 24b, flows through the one way resistance device 51 with a substantial resistance being opposed to said flow by said one way resistance device 51, then flows through the conduit 24a and through the flow divider 23 in the reverse direction to that described above with a certain characteristic further flow resistance being opposed to said flow by said flow divider 23, and then via the conduit 22 and the electromagnetic switching valve 45 which is in its said third position is vented via the conduit 48 to the working fluid reservoir 1. Thus, again, the piston and rod combination 7RR is allowed to move upwards in the figure at a relatively slow and controlled speed determined by the effective cross sectional area of the throttling device 55 and the aforementioned characteristic reverse resistance of the flow divider 23, so as to allow the rear right wheel of the vehicle to move upwards with respect to the vehicle body, thus lowering the rear right corner of said vehicle body towards the ground. And, finally, also the fluid in the cylinder chamber 9RL and in the working fluid chamber 10RL of the suspension unit 5 for the rear left wheel flows out therefrom into the conduit 25c, flows through the one way resistance device 52 with a substantial resistance being opposed to said flow by said one way resistance device 52, then flows through the conduit 25b through the electromagnetic switching valve 65 which is as mentioned above kept open at this time, and flows through the conduit 25a and through the flow divider 23 in the reverse direction to that described earlier with a certain characteristic further flow resistance being opposed to said flow by said flow divider 23, and then via the conduit 22 and the electromagnetic switching valve 45 is vented via the conduit 48 to the working fluid reservoir 1. Thus, again, the piston and rod combination 7RL is allowed to move upwards in the figure at a relatively slow and controlled speed determined by the effective cross sectional area of the throttling device 56 and the aforementioned characteristic reverse resistance of the flow divider 23, so as to allow the rear left wheel of the vehicle to move upwards with respect to the vehicle body, thus lowering the rear left corner of said vehicle body towards the ground. And, during the above outlined process, if the resistances of the four throttling devices 53, 54, 55, and 56 are properly chosen, in view of the aforementioned reverse flow resistance characteristics of the flow divider 23 and in view of the flow resistances of the conduit systems 20a, 20b, etc., 21a, 21b, etc., 24a, 24b, etc. and 25a, 25b, 25c, etc. which quite possibly may be different, then the rates of lowering of the four corners of the vehicle body will be ensured to be substantially the same, thus ensuring no tendency for the vehicle to turn around its roll axis or its pitch axis as it drops.

RAISING FRONT WHILE KEEPING REAR AT CONSTANT HEIGHT (e) When it is desired to raise both sides of the front of the vehicle simultaneously, while keeping the elevation of both sides of the rear of the vehicle constant, thus altering the pitch angle of the vehicle, assuming that the engine of the vehicle is running, then the control device 66 closes the electromagnetic switching valve 42 by not supplying its solenoid 42a with actuating electrical energy, either opens or closes the electromagnetic switching valve 65 by supplying its solenoid 65a with actuating electrical energy or not, according as to whether or not high roll resistance is being required for the vehicle at this time, as explained previously, controls the electromagnetic switching valves 43 and 44 to be in their above specified second positions by appropriately supplying actuating electrical energy to their solenoids 43a and 44a, and controls the electromagnetic switching valve 45 to be in its above specified first position by appropriately supplying actuating electrical energy to its solenoid 45a. In this condition, by a combination of the actions as explained previously with regard to case (a) and case (c) above, the front right and the front left wheels of the vehicle are driven downwards with respect to the vehicle body, while the rear right and the rear left wheels of the vehicle are kept at a constant position with respect to said vehicle body. And the thus produced rates of raising of the front right corner and the front left corner of the vehicle body, if the previously explained tailoring of the flow characteristics of the flow divider 17 with respect to case (a) has been performed, are ensured to be substantially the same, thus ensuring no frontwise tendency for the vehicle to turn around its roll axis as it thus rises while of course turning about its pitch axis. And on the other hand, if the engine of the vehicle is not running while this process of raising the front end only of the vehicle is required, then in a fashion analogous to that performed in the case (b) described above the control device 66 opens the electromagnetic switching valve 42 by supplying its solenoid 42a with actuating electrical energy, while maintaining the operational states of the other electromagnetic valves as described above, and in this case the source of pressurized working fluid for raising the vehicle is the accumulator 38, instead of the pump 26; the details will be easily supplied by the reader of this specification, based upon the details given hereinabove.

LOWERING FRONT WHILE KEEPING REAR AT CONSTANT HEIGHT (f) When it is desired to lower both sides of the front of the vehicle simultaneously, while keeping the elevation of both sides of the rear of the vehicle constant, thus altering the pitch angle of the vehicle, then, irrespective of whether or not the engine of the vehicle is running, the control device 66 opens the electromagnetic switching valve 42 by supplying its solenoid 42a with actuating electrical energy, either opens or closes the electromagnetic switching valve 65 by supplying its solenoid 65a with actuating electrical energy or not, according as to whether or not high roll resistance is being required for the vehicle at this time, as explained previously, controls the electromagnetic switching valves 43 and 44 to be in their above specified third positions by appropriately supplying actuating electrical energy to their solenoids 43a and 44a, and controls the electromagnetic switching valve 45 to be in its above specified first position by appropriately supplying actuating electrical energy to its solenoid 45a. In this condition, by a combination of the actions as explained previously with regard to case (c) and case (d) above, the front right and the front left wheels of the vehicle are allowed to move upwards with respect to the vehicle body, while the rear right and the rear left wheels of the vehicle are kept at a constant position with respect to said vehicle body. And the thus produced rates of lowering of the front right corner and the front left corner of the vehicle body, if the previously explained tailoring of the flow characteristics of the throttling elements 53 and 54 of the one way resistance devices 59 and 50 with respect to case (d) has been performed, are ensured to be substantially the same, thus ensuring no frontwise tendency for the vehicle to turn around its roll axis as it thus drops while of course turning about its pitch axis.

RAISING REAR WHILE KEEPING FRONT AT CONSTANT HEIGHT (g) When it is desired to raise both sides of the rear of the vehicle simultaneously, while keeping the elevation of both sides of the front of the vehicle constant, thus again altering the pitch angle of the vehicle, assuming that the engine of the vehicle is running, then the control device 66 closes the electromagnetic switching valve 42 by not supplying its solenoid 42a with actuating electrical energy, opens the electromagnetic switching valve 65 by supplying its solenoid 65a with actuating electrical energy, controls the electromagnetic switching vaves 43 and 44 to be in their above specified first positions by appropriately supplying actuating electrical energy to their solenoids 43a and 44a, and controls the electromagnetic switching valve 45 to be in its above specified second position by appropriately supplying actuating electrical energy to its solenoid 45a. In this condition, by another combination of the actions as explained previously with regard to case (a) and case (c) above, the front right and the front left wheels of the vehicle are kept at a constant position with respect to said vehicle body, while the rear right and the rear left wheels of the vehicle are driven downwards with respect to the vehicle body. And the thus produced rates of raising of the rear right corner and the rear left corner of the vehicle body, if the previously explained tailoring of the flow characteristics of the flow divider 23 with respect to case (a) has been performed, are ensured to be substantially the same, thus ensuring no frontwise tendency for the vehicle to turn around its roll axis as it thus rises while of course turning about its pitch axis. And on the other hand, if the engine of the vehicle is not running while this process of raising the rear end only of the vehicle is required, then in a fashion analogous to that performed in the case (b) described above the control device 66 opens the electromagnetic switching valve 42 by supplying its solenoid 42a with actuating electrical energy, while maintaining the operational states of the other electromagnetic valves as described above, and in this case the source of pressurized working fluid for raising the vehicle is the accumulator 38, instead of the pump 26; the details will be easily supplied by the reader of this specification, based upon the details given hereinabove.

LOWERING REAR WHILE KEEPING FRONT AT CONSTANT HEIGHT (h) When it is desired to lower both sides of the rear of the vehicle simultaneously, while keeping the elevation of both sides of the front of the vehicle constant, thus again altering the pitch angle of the vehicle, then, irrespective of whether or not the engine of the vehicle is running, the control device 66 opens the electromagnetic switching valve 42 by supplying its solenoid 42a with actuating electrical energy, opens the electromagnetic switching valve 65 by supplying its solenoid 65a with actuating electrical energy, controls the electromagnetic switching valves 43 and 44 to be in their above specified first positions by appropriately supplying actuating electrical energy to their solenoids 43a and 44a, and controls the electromagnetic switching valve 45 to be in its above specified third position by appropriately supplying actuating electrical energy to its solenoid 45a. In this condition, by another combination of the actions as explained previously with regard to case (c) and case (d) above, the rear right and the rear left wheels of the vehicle are allowed to move upwards with respect to the vehicle body, while the front right and the front left wheels of the vehicle are kept at a constant position with respect to said vehicle body. And the thus produced rates of lowering of the rear right corner and the front left corner of the vehicle body, if the previously explained tailoring of the flow characteristics of the throttling elements 55 and 56 of the one way resistance devices 51 and 52 with respect to case (d) has been performed, are ensured to be substantially the same, thus ensuring no rearwise tendency for the vehicle to turn around its roll axis as it thus drops while of course turning about its pitch axis.

TILTING THE VEHICLE (i) When it is desired to alter the relative elevation of the left and right sides of the vehicle, while keeping the general elevation of its front and its rear substantially constant, then it will be understood that this tilting can only be done by relative alteration of the height of the front left and right wheels of the vehicle, since basically the rear wheels are controlled together with regard to their height. For example, if it is desired to raise the right side of the vehicle while lowering its left side, then, assuming that the engine of the vehicle is being operated, the control device 66 closes the electromagnetic switching valve 42 by not supplying its solenoid 42a with actuating electrical energy, either opens or closes the electromagnetic switching valve 65 by supplying its solenoid 65a with actuating electrical energy or not, according as to whether or not high roll resistance is being required for the vehicle at this time, as explained previously, controls the electromagnetic switching valve 43 to be in its above specified second position by appropriately supplying actuating electrical energy to its solenoid 43a, controls the electromagnetic switching valve 44 to be in its above specified third position by appropriately supplying actuating electrical energy to its solenoid 44a, and controls the electromagnetic switching valve 45 to be in its above specified first position by appropriately supplying actuating electrical energy to its solenoid 45a. In this condition of the suspension system, by a combination of the actions as explained previously with regard to case (a), case (b), and case (c) above, the front right wheel of the vehicle is driven downwards with respect to the vehicle body, and the front left wheel of the vehicle is allowed to move upwards with respect to the vehicle body, while the rear right and the rear left wheels of the vehicle are kept at a constant position with respect to said vehicle body. Thus, the vehicle tends to rotate about its roll axis, while not substantially rotating about its pitch axis.

Figure 3:
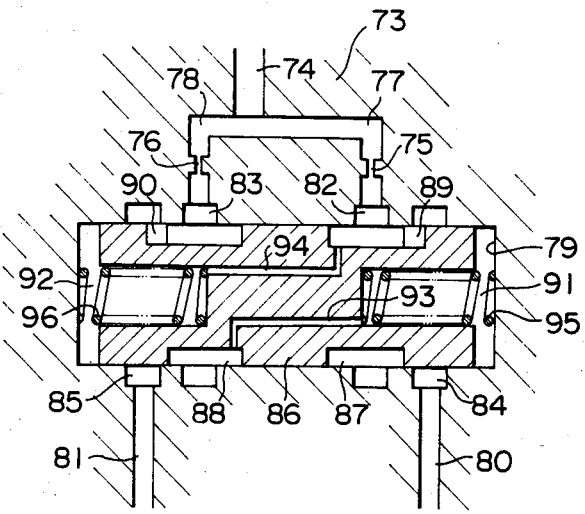
FIG. 3 is an axial sectional view of a possible construction for a basic type of flow divider valve incorporated in the first preferred embodiment of the vehicle height adjustment system according to the present invention.

Now, in FIG. 3 there is shown an axial sectional view of a possible basic construction for the flow dividers 14, 17, and 23, which are used in the first preferred embodiment of the vehicle height adjustment system of the present invention; this basic construction for these flow dividers is one which provides a fixed ratio for division of the flow into the input of the flow divider between its two outputs, according to the operational principle of said first preferred embodiment. Later, with reference to FIG. 4, a structure will be described for the flow dividers 14, 17, 23 which provides an alterable and controllable ratio for division of the flow into the input of the flow divider between its two outputs, according to the operational principle of the second preferred embodiment of the vehicle height adjustment system of the present invention.

Considering first this basic construction for the first preferred embodiment as shown in FIG. 3, the flow divider is formed within a body 73, and this body 73 defines an input passage 74, two passages 77 and 78 which branch off from said input passage 74 and lead to two throttling elements 75 and 76 respectively. The other sides of these throttling elements 75 and 76 are respectively communicated to ports 82 and 83 which open into a valve bore 79 formed in said body 73 of the flow divider; these ports 82 and 83 are in fact formed as annular grooves extending around the circumference of said valve bore 79. And two other annular port grooves 84 and 85 are provided as extending around the circumference of said valve bore 79, on the other sides of said annular grooves 82 and 83 respectively from the axial center of the valve bore 79 and axially spaced away from said annular grooves 82 and 83 respectively by a certain distance. Within this valve bore 79 there is slidably fitted a valve element 86, which is somewhat shorter in its axial length than the valve bore 79 so that it can reciprocate to and fro in said valve bore 79 for a certain reciprocation distance, and around the circumference of which there are formed two fairly wide annular grooves 87 and 88, said annular grooves 87 and 88 corresponding to the grooves 82 and 83 respectively so that said annular grooves 87 and 88 are always in communication with said annular grooves 82 and 83 respectively, over all of the allowed reciprocating travel of the valve element 86 in the bore 79. On the surface of the valve element 86 on the outer sides of these annular grooves 87 and 88 respectively there are formed axially extending notches 89 and 90, and these axially extending notches 89 and 90 and the annular grooves 87 and 88 cooperate with the annular port grooves 84 and 85 respectively, so as to define throttles whose resistance varies as the valve element 86 moves in its valve bore 79.

In detail, referring to the figure, when the valve element 79 is at its extreme position to the left, then the notch 89 does not come into register with the annular port groove 84 at all, and accordingly the flow resistance between the port 82 and an output passage 80 leading from said annular port groove 84 is substantially infinite, while on the other hand the notch 90 and even some portion of the annular groove 88 on the valve element 86 come into register with the annular port groove 85, and accordingly the flow resistance between the port 83 and an output passage 81 leading from said annular port groove 85 is substantially zero. As the valve element 86 moves axially to the right in its bore 79 from this extreme position, then the notch 89 comes into register with the annular port groove 84, first only a little, and then more and more, and accordingly the flow resistance between the port 82 and the output passage 80 leading from said annular port groove 84 comes to drop steadily downwards, while on the other hand after the annular groove 88 on the valve element 86 is brought out of register with the annular port groove 85 then as further more and more the notch 90 is brought out of register with said annular port groove 85 the flow resistance between the port 83 and the output passage 81 leading from said annular port groove 85 rises steadily upwards. And, when the valve element 86 reaches a certain axial position in its rightwards motion in the bore 79, then the notch 90 is brought completely out of register with the annular port groove 85, and accordingly the flow resistance between the port 83 and the output passage 81 becomes substantially infinite; and also as said valve element 86 reaches some other certain axial position (which may be the same axial position as the abovementioned one) in its rightward motion, then the annular groove 87 on the valve element 86 comes to be in register with the annular port groove 84, and accordingly the flow resistance between the port 82 and the output passage 80 is substantially zero.

At the right and left ends respectively in the drawing of the valve bore 79 there are defined between the ends of said bore 79 and the ends of the valve element 86 two valve chambers 91 and 92. Within these valve chambers 91 and 92 there are housed biasing compression coil springs 95 and 96 respectively, which in fact sit in tubular holes formed in the ends of the valve element 86, and these compression coil springs 95 and 96 each bears between an end of the bore 79 and a corresponding end of the valve element 86, so as to provide an effect to bias the valve element 86 towards the central point in its bore 79, from either direction. And each of the valve chambers 91 and 92 is connected to the opposite one 88 and 87 respectively of the annular grooves around the valve element 86 by a passage 93 and 94 formed in the valve element 86, respectively.

This flow divider shown in FIG. 3 operates as follows. It is assumed that the structure described above is symmetrically constructed, with regard to the dimensions of the various parts and the strengths of the compression coil springs 91 and 92 and so on. Suppose that a source of hydraulic fluid pressure is supplying a pressurized flow of hydraulic fluid (working fluid) to the input 74 of the flow divider, with the valve element 86 located approximately at the middle of the bore 79, so that this flow of hydraulic fluid is being divided to flow into the conduits 77 and 78 and then through the throttling elements 75 and 76 respectively. In this situation, the flow from the throttling element 75 is then passing through the annular port 82, into the annular groove 87 of the valve element 86, and thence via the axial groove 89 into the annular port groove 84 with which said axial groove 89 is partly in register, thence to flow out of the outlet conduit 80 of the flow divider; and, similarly, the flow from the throttling element 76 is then passing through the annular port 83, into the annular groove 88 of the valve element 86, and thence via the axial groove 90 into the annular port groove 85 with which said axial groove 90 is partly in register, thence to flow out of the outlet conduit 81 of the flow divider. And suppose that both of these flows are taking place with a certain reasonably great flow amount. Now, suppose that the pressure just downstream of the throttling element 75, at the port 82, becomes greater than the pressure just downstream of the other throttling element 76, at the port 83, for some reason. In this case, the pressure in the left hand end chamber 92 of the flow divider, which is being supplied through the passage 94 from said pressure just downstream of the throttling element 75, will becomes somewhat greater than the pressure in the right hand end chamber 91 of the flow divider, which is being supplied through the passage 93 from said pressure just downstream of the throttling element 76. Accordingly, the valve element 76 will be shifted somewhat rightwards in the bore 79, by an amount determined by the characteristics of the compression coil springs 91 and 92. This will cause the axial groove 89 to come more into register with the annular port groove 84, which will cause the flow resistance presented between the annular groove 87 on the valve element 86 and the annular port groove 84 to drop; and, similarly in a reversed manner, the other axial groove 90 will now come less into register with the other annular port groove 85, which will cause the flow resistance presented between the other annular groove 88 on the valve element 86 and the annular port groove 85 to drop. Accordingly, the pressure at the port 82 will drop, since it is now being transmitted more readily to the output conduit 80 through a lower flow resistance, while on the other hand the pressure at the port 83 will rise, since it is now being transmitted less readily to the output conduit 81 through a higher flow resistance. Thereby, the pressure just downstream of the throttling element 75 at the port 82, and the pressure just downstream of the other throttling element 76 at the port 83, are brought towards one another. Thus, this analysis shows that, in the operation of the flow divider of FIG. 3, the pressures just downstream of the throttling elements 75 and 76 are kept substantially the same, provided of course that certain limits relating to the operation of the system are not exceeded (for instance, if one of the conduits 80 and 81 becomes completely blocked, of course this operation will no longer apply). Thereby, it is ensured that the proportion by which the flow into the input conduit 74 of the flow divider is divided between the ouput conduits 80 and 81 thereof is kept as determined substantially solely by the ratio between the effective flow resistances of the throttling elements 75 and 76, and is not altered when the ratio between the resistances downstream of the conduits 80 and 81 alters, within said certain limits. Thus, the flow divider shown in FIG. 3 performs its above specified function, and therefore functions in the first preferred embodiment of the vehicle height adjustment system shown in FIGS. 1 and 2 as specified.

Figure 4:
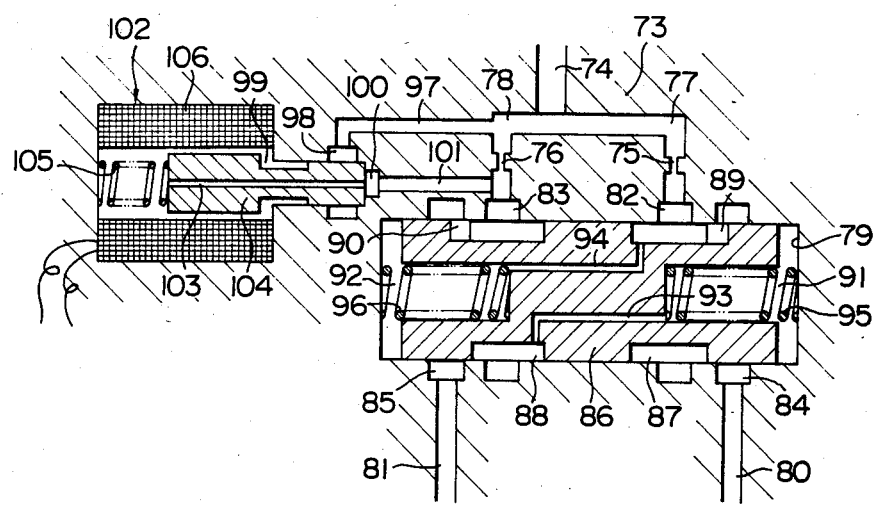
FIG. 4 is an axial sectional view, similar to FIG. 3, of another more elaborated possible construction for a flow divider valve incorporated in a second preferred embodiment of the vehicle height adjustment system according to the present invention, this flow divider valve being electrically adjustable with regard to its performance.

In FIG. 4, there is shown a further refinement of the flow divider. This flow divider, which may be used for any of the flow dividers 14, 17, and 23, is adjustable with regard to the ratio for division of the flow into its input between its two outputs, according to the operational principle of the second preferred embodiment of the vehicle height adjustment system of the present invention, said ratio thus being alterable and controllable. This flow divider of FIG. 4 includes, in addition to a structure similar to the FIG. 3 structure of the first preferred embodiment, the parts of which are denoted by the same reference numerals and which will not be particular described here, an electromagnetic solenoid device 102, which has an input conduit 97 and an output conduit 101. The input conduit 97 is communicated to the conduit 78 upstream of the throtting device 76, and the output conduit 101 is communicated to the port 93 downstream of said throtting device 76. In the solenoid device 102, both the input conduit 97 and the output conduit 101 are connected to a valve chamber 99 thereof, the opening of said output conduit 101 to said valve chamber 99 defining a control port 100. A laterally reciprocable valve element 104 is slidably fitted into the valve chamber 99, and is biased in the rightward direction in the figure by a compression coil spring 105, while it is selectively pulled leftwards in the figure by a solenoid coil 106 which is selectively supplied with actuating electrical energy by the control device 66, described earlier. And, when said valve element 104 is in its rightmost position in the valve chamber 99 under the biasing influence of the compression coil spring 103, its end closes the control port 100, so that the input conduit 97 and the output conduit 101 of the solenoid device 102 are discommunicated from one another so that the effective flow resistance of the solenoid valve 102 is infinite; while on the other hand, when said valve element 104 is displaced leftwards in the figure from its said rightmost position in the valve chamber 99 by the attraction of the solenoid coil 106 against the biasing influence of the compression coil spring 103 which is overcome, its end opens said control port 100, so that the input conduit 97 and the output conduit 101 of the solenoid device 102 are communicated to one another so that the effective flow resistance of the solenoid valve 102 is reduced. And a passage 103 is formed through said valve element 104, so as to communicate the space to the left of it in the figure to the space to the right of it, i.e. to the valve port 100: this is done in order to remove the influence of the pressure present at said valve port 100 on the opening and closing of the solenoid valve 102.

Thus, considering the operation of the flow divider of FIG. 4 as a whole, when the solenoid coil 106 of the solenoid valve 102 is not energized, then as explained with reference to the flow divider of FIG. 3 the flow of working fluid into its input passage 74 is divided between its output passages 80 and 81 in a ratio determined by the ratio of the effective flow resistances of the throtting devices 76 and 77. However, when the solenoid coil 106 of the solenoid valve 102 is energized, then the effective resistance of the throttling device 76, only, and not that of the other throttling device 77, is reduced, by an amount determined by the resultant flow resistance of said solenoid valve 102, and in this operational state the flow of working fluid into the input passage 74 of the flow divider is now divided between its output passages 80 and 81 in a ratio determined by the ratio of the effective flow resistance of the parallel combination of the throtting device 76 and the solenoid valve 102, to the effective flow resistance of said other throttling device 77. By such an action as this, the ratio by which the flow divider of FIG. 4 divides the input flow into it between its two outputs can be altered. And, depending upon the application to which the flow divider is put in the vehicle height adjustment system of the present invention, this can cause an alteration in the proportional allocation of flow of working fluid between the conduits 15 and 16, thereby to alter the relative amounts of fluid supplied to the suspension systems for the front and the rear of the vehicle (in the case that this type of flow divider is used for the flow divider 14 of FIG. 1), or can alternatively cause an alteration in the proportional allocation of flow of working fluid between the conduits 18 and 19, or 24a and 25a, thereby to alter the relative amounts of fluid supplied to the suspension systems for the left and the right sides of the vehicle (in the case that this type of flow divider is used for the flow divider 17 or the flow divider 23 of FIG. 1).

According to various variations in application, depending upon the characteristics of the compression coil spring 105 and the nature of the control of the solenoid valve 102 exerted by the control device 66, this performance of the FIG. 4 flow divider used in the second embodiment of the present invention can be altered. In a first type of application, the FIG. 4 flow divider can be used as providing a continuous variation of its performance of allocating the division of its input flow between its two outlets, and this continuous variation performance can be provided by continuously varying the voltage or the current supplied to the solenoid coil 106 from a minimum of zero, which will give a maximum flow resistance for the parallel combination of the throtting device 76 and the solenoid valve 102 and thus will cause a maximum proportion of the total input flow to the flow divider to be allocated to the conduit 80 and a minimum proportion of said total input flow to be allocated to the output conduit 81, through intermediate values which will give intermediate values of said proportion, to a mininum of zero which will give a minimum flow resistance for the parallel combination of the throtting device 76 and the solenoid valve 102 and thus will cause a maximum proportion of the total input flow to the flow divider to be allocated to the conduit 81 and a minimum proportion of said total input flow to be allocated to the output conduit 80. In another type of application, the flow divider can be used as providing a mere ON/OFF or quantum or bang-bang variation of its performance of allocating the division of its input flow between its two outlets, and in such a case no positions of the valve element 104 are relevant, except its extreme positions in its bore in said valve chamber 99. In other words, the solenoid coil 106 is either not provided by the control device 66 with actuating electrical energy at all, which allows the valve element 104 to be biased to it extreme rightward position in its bore by the action of the compression coil spring 105, thus providing a maximum flow resistance for the parallel combination of the throtting device 76 and the solenoid valve 102 and thus as before causing a maximum proportion of the total input flow to the flow divider to be allocated to the conduit 80 and a minimum proportion of said total input flow to be allocated to the output conduit 81, or alternatively said solenoid coil 106 is provided with a sufficiently large amount of actuating electrical energy to definitely completely displace the valve element 104 to its extreme leftward position in its bore against the action of the compression coil spring 105 which is substantially completely overcome, thus providing a minimum flow resistance for the parallel combination of the throtting device 76 and the solenoid valve 102 and thus as before causing a minimum proportion of the total input flow to the flow divider to be allocated to the conduit 80 and a maximum proportion of said total input flow to be allocated to the output conduit 81; and no intermediate values for the amount of electrical energy supplied to said solenoid coil 106, or for the position of the valve element 104 in its bore, are availabe. Further, according to a modification of this second type of application for the FIG. 4 flow divider, it can be used as providing this ON/OFF or quantum or bang-bang variation of its performance, according to a repetitive pulse signal supplied to it by the control device 66, i.e. according to a duty ratio pulse signal. In such a case, since the operation of the vehicle height adjustment system shown in FIG. 1 has a certain time lag and operational inertia, the effect of the above described first type of performance of providing a continuous variation of allocating the division of its input flow between the two outlets of the flow divider may be available, without any particular mechanical sophistication being required in said flow divider.

Thus it is seen that, according to the present invention, because each of the flow divider means divides the supply of pressurized working fluid fed to it in its substantially determinate ratio between its two outlets, irrespective of the pressures at said two outlets, thereby the raising and/or lowering of the wheels or sets of wheels which are supplied with working fluid from these two outlets are performed at substantially the same relative rate, whatever may be the load distribution on the vehicle. Thus, it is possible to adjust the vehicle elevation while maintaining its body horizontal with regard to the fore and aft direction, i.e. without its body rotating about its pitch axis. And also, by appropriately selecting said ratio of flow division provided by said flow divider, optionally by varying it as shown in the FIG. 4 embodiment, it becomes possible also to synchronize the starting and the ending of vehicle height adjustment relative to the various wheels thereof, even if the amount of adjustment of the vehicle wheel elevation is required to mutually differ between the wheels. Accordingly, this vehicle height adjustment system can properly change the vehicle height substantially irrespective of the vehicle load condition, and further is not disturbed in its operation by change of the viscosity of the working fluid. Thus, this vehicle height adjustment system is not liable to cause anxiety to the occupants of the vehicle, and also does not worsen the visual field of the driver during the vehicle height adjustment process, as well as not deteriorating the drivability of the vehicle. Further, this vehicle height adjustment system does not disturb the adjustment of the headlamps during the vehicle height adjustment process, and also does not deteriorate the aerodynamic qualities of the vehicle, thus keeping the vehicle economy good even during the process of vehicle height adjustment. Thus, the present invention keeps vehicle running conditions good at all times.

The shown structure according to the present invention also has the following further advantages.

Because the pump 26, the flow rate control valve 28, and the relief valve 29 are shared both by the vehicle height adjustment system and also by the other working fluid actuated device such as the device 32 such as a power steering unit, thereby the weight of the vehicle as a whole, and its cost, are reduced, as well as making the vehicle as a whole compact, as opposed to the prior art type of construction in which a separate pump and pressure control system are provided for such a separate device.

In the case that the vehicle height is to be uniformly increased while its engine is running, i.e. the previously detailed operational case (a), then, because the pressurized working fluid is supplied from the pump 26 to each of the suspension units 2, 3, 4, and 5 with the electromagnetic switching valve 42 closed, thus the speed of raising the vehicle can be maintained substantially fixed. And also, when the vehicle elevation is increased for adjustment immediately before the engine is stopped and the vehicle elevation is increased for adjustment thereafter with the engine being stopped, the accumulated pressure of the working fluid in the accumulator 38 is prevented from dropping below the predetermined lower limit of the pressure control valve 33, and thereby the increase of the vehicle elevation for adjustment thereafter with the engine being stopped can be made positively and quickly.

Further, because the working fluid in the cylinder chambers 9FR etc. of the actuators 2 to 5 is forcibly passed through the throttles 53 to 56 when the vehicle elevation is to be adjusted by being reduced, even when the pressures of the working fluid in these cylinder chambers 9FR etc. of each of the actuators 2 to 5 differ one from the other due to the state of the load carried by the vehicle, the reduction of the vehicle elevation may be made at substantially the same speed and the vehicle elevation for each of the wheels may be reduced at a substantially fixed speed.

Also, because the electromagnetic switching valve 42 is kept in the open state except for the case in which the vehicle elevation is to be adjusted by being increased with the pump 26 activated by the vehicle engine being operated, and because the conduit 13 downstream of the pressure control valve 33 is always communicated with the accumulator 38, even if there is any leakage of working fluid at any one of the actuators 2 through 5, the pressure of the working fluid downstream of the pressure control valve 33 is prevented from dropping sharply, and thereby the hunting phenomenon of the pressure control valve 33, which may occur in a vehicle elevation adjustment system which does not have an accumulator 38 and which supplies the working fluid from the pump directly to each of the actuators, can be positively prevented from occurring.

Although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A height adjustment system for a vehicle with wheels and a body, said height adjustment system comprising:
  (a) a source of pressurized working fluid;
  (b) a plurality of fluid pressure actuated wheel suspension units, each of which resiliently pushes a one of said wheels of said vehicle downwards with respect to said body thereof, according to the amount of pressurized working fluid supplied to said wheel suspension unit;
  (c) a passage means for conducting supply of working fluid from said source thereof to said wheel suspension units;
  (d) a plurality of valve means, provided at intermediate points of said passage means, for controlling flow of working fluid therethrough; and
  (e) a flow divider means comprising an inlet and two outlets, one of said outlets being communicated to a first set of said wheel suspension units for a first set of said wheels of said vehicle and the other of said outlets being communicated to a second disjoint set of said wheel suspension units for a second disjoint set of said wheels of said vehicle, incorporated at an intermediate point of said passage means, for providing a branch point of said passage means; for receiving supply of pressurized working fluid at its said inlet; for dividing said supply between its two said outlets in a ratio which is substantially independent of the pressure at said two outlets; and for being controlled with regard to said ratio substantially independent of the pressures at said two outlets thereof in which it divides said working fluid supply to it between its two said outlets.

2. A vehicle height adjustment system according to claim 1, wherein said first set of said wheels of said vehicle is a set of two front wheels thereof and said second set of said wheels of said vehicle is a set of two back wheels thereof.

3. A vehicle height adjustment system according to claim 1, wherein said first set of said wheels of said vehicle is a left front wheel thereof and said second set of said wheels of said vehicle is a right front wheel thereof.

4. A vehicle height adjustment system according to claim 1, wherein said first set of said wheels of said vehicle is a left rear wheel thereof and said second set of said wheels of said vehicle is a right rear wheel thereof.

5. A height adjustment system for a vehicle with a right and left front wheel and a right and left rear wheel and a body, said height adjustment system comprising:
  (a) a source of pressurized working fluid;
  (b) a plurality of fluid pressure actuated wheel suspension units, each of which resiliently pushes a one of said wheels of said vehicle downwards with respect to said body thereof, according to the amount of pressurized working fluid supplied to said wheel suspension unit;
  (c) a passage means for conducting supply of working fluid from said source thereof to said wheel suspension units;
  (d) a plurality of valve means, provided at intermediate points of said passage means, for controlling flow of working fluid therethrough; and
  (e) first, second, and third flow divider means each comprising an inlet and two outlets and being incorporated at an intermediate point of said passage means for providing a branch point of said passage means and for receiving supply of pressurized working fluid at its said inlet and for dividing said supply between its two said outlets in a ratio which is substantially independent of the pressures at said two outlets;
  (f) one of said outlets of said first flow divider means being communicated by a part of said passage means to the inlet of said second flow divider means, and the other of said outlets of said first flow divider means being communicated by another part of said passage means to the inlet of said third flow divider means, one of said outlets of said second flow divider means being communicated by another part of said passage means to the suspension unit for the right front wheel of said vehicle, and the other of said outlets of said second flow divider means being communicated by another part of said passage means to the suspension unit for the left front wheel of said vehicle; and one of said outlets of said third flow divider means being communicated by another part of said passage means to the suspension unit for the right rear wheel of said vehicle, and the other of said outlets of said third flow divider means being communicated by another part of said passage means to the suspension unit for the left rear wheel of said vehicle.

6. A vehicle height adjustment system according to claim 1, wherein said flow divider means comprises a pair of throttling elements the upstream sides of which are communicated to said inlet of said flow divider means, a means for maintaining the pressures downstream of said two throttling elements substantially the same, a means for communicating the downstream sides of said throttling elements to said two outlets of said flow divider means respectively, and a means for selectively providing a bypass fluid path between the upstream and the downstream of one of said throttling elements.

7. A height adjustment system for a vehicle with wheels and a body, said height adjustment system comprising:
  (a) a source of pressurized working fluid;
  (b) a plurality of fluid pressure actuated wheel suspension units, each of which resiliently pushes a one of said wheels of said vehicle downwards with respect to said body thereof, according to the amount of pressurized working fluid supplied to said wheel suspension unit;
  (c) a passage means for conducting supply of working fluid from said source thereof to said wheel suspension units;
  (d) a plurality of valve means, provided at intermediate points of said passage means, for controlling flow of working fluid therethrough; and
  (e) a flow divider means comprising an inlet and two outlets, one of said outlets being communicated to a first set of said wheel suspension units for a first set of said wheels of said vehicle and the other of said outlets being communicated to a second disjoint set of said wheel suspension units for a second disjoint set of said wheels of said vehicle, incorporated at an intermediate point of said passage means, for providing a branch point of said passage means; for receiving supply of pressurized working fluid at its said inlet; for dividing said supply between its two said outlets in a ratio which is substantially independent of the pressure at said two outlets; and for being controlled with regard to said ratio substantially independent of the pressures at said to outlets thereof in which it divides said working fluid supply to it between its two said outlets, and for being selectively settable to either of two different such ratios.

8. A vehicle height adjustment system according to claim 7, wherein said first set of said wheels of said vehicle is a set of two front wheels thereof and said second set of said wheels of said vehicle is a set of two back wheels thereof.

9. A vehicle height adjustment system according to claim 7, wherein said first set of said wheels of said vehicle is a left front wheel thereof and said second set of said wheels of said vehicle is a right front wheel thereof.

10. A vehicle height adjustment system according to claim 7, wherein said first set of said wheels of said vehicle is a left rear wheel thereof and said second set of said wheels of said vehicle is a right rear wheel thereof.

11. A height adjustment system for a vehicle with wheels and a body, said height adjustment system comprising:
  (a) a source of pressurized working fluid;
  (b) a plurality of fluid pressure actuated wheel suspension units, each of which resiliently pushes a one of said wheels of said vehicle downwards with respect to said body thereof, according to the amount of pressurized working fluid supplied to said wheel suspension unit;
  (c) a passage means for conducting supply of working fluid from said source thereof to said wheel suspension units;

(d) a plurality of valve means, provided at intermediate points of said passage means, for controlling flow of working fluid therethrough; and (e) a flow divider means comprising an inlet and two outlets, one of said outlets being communicated to a first set of said wheel suspension units for a first set of said wheels of said vehicle and the other of said outlets being communicated to a second disjoint set of said wheel suspension units for a second disjoint set of said wheels of said vehicle, incorporated at an intermediate point of said passage means; for providing a branch point of said passage means; for receiving supply of pressurized working fluid at its said inlet; for dividing said supply between its two said outlets in a ratio which is substantially independent of the pressure of said two outlets; for being controlled with regard to said ratio substantially independent of the pressures at said two outlets thereof in which it divides said working fluid supply to it between its two said outlets; and for being selectively settable to substantially any such ratio between two extreme different such ratios.

12. A vehicle height adjustment system according to claim 11, wherein said first set of said wheels of said vehicle is a set of two front wheels thereof and said second set of said wheels of said vehicle is a set of two back wheels thereof.

13. A vehicle height adjustment system according to claim 11, wherein said first set of said wheels of said vehicle is a left front wheel thereof and said second set of said wheels of said vehicle is a right front wheel thereof.

14. A vehicle height adjustment system according to claim 11, wherein said first set of said wheels of said vehicle is left rear wheel thereof and said second set of said wheels of said vehicle is a right rear wheel thereof.

* * * * *